United States Patent [19]

Mann et al.

[11] 4,315,820
[45] Feb. 16, 1982

[54] SELF-CLEANING STRAINER

[75] Inventors: Alexander B. Mann; John B. Kraeling, Jr.; Ronald G. Bukowski, all of Erie, Pa.

[73] Assignee: Zurn Industries, Inc., Erie, Pa.

[21] Appl. No.: 114,679

[22] Filed: Jan. 23, 1980

[51] Int. Cl.³ ............................................. B01D 29/38
[52] U.S. Cl. ...................................... 210/408; 210/411
[58] Field of Search ............... 210/107, 108, 143, 408, 210/411, 413, 415, 333.1, 333.2, 393, 488, 253

[56] References Cited

U.S. PATENT DOCUMENTS

| | | | |
|---|---|---|---|
| 2,855,106 | 10/1958 | English | 210/488 X |
| 2,934,872 | 10/1960 | Liddell | 210/333.1 |
| 3,333,700 | 8/1967 | Coleman | 210/393 |
| 3,561,603 | 2/1971 | Salomon | 210/415 |
| 3,734,299 | 5/1973 | Akiyama | 210/333.1 |
| 3,784,016 | 1/1974 | Akiyama | 210/333.1 |

Primary Examiner—John Adee
Attorney, Agent, or Firm—Webb, Burden, Robinson & Webb

[57] ABSTRACT

A strainer of the self-cleaning type includes a strainer element capable of removing matted debris by backwashing. The strainer element comprises a plurality of stacked annular strainer plates maintained in spaced relationship to form straining passages wherein the passages are substantially greater in depth than height. Protruding surfaces of the strainer element form vertically aligned compartments along its upstream side. The compartments collect the debris. A rotating backwash arm or arms are provided which may carry at least one cutting blade. The blade cuts matted debris extending between compartments into sections as it passes over these protruding surfaces and these sections are removed by backwashing.

17 Claims, 8 Drawing Figures

SELF-CLEANING STRAINER

FIELD OF THE INVENTION

Our invention relates to improvements in automatic backwashing type strainers or filters and, more particularly, to strainers for a fluid media which includes fibrous or other forms of debris which tend to mat and clog the strainer element.

DESCRIPTION OF THE PRIOR ART

Fluid strainers have been employed for many years in which accumulated solids or sedimentation strained from the fluid is collected on the screening media and thereafter removed from the screening media by means of a backwash shoe in which a portion of the fluid being strained is caused to flow in a reverse direction to clean the strainer. More recently it has been recognized that the backwashing liquid may be supplied from an external source and at a pressure above the pressure of the fluid in the strainer. Exemplary of this is U.S. Pat. No. 3,074,560.

It has also been known to provide a scraping shoe which advances over the surface of a straining member and removes surface deposits which are then accumulated and immediately backwashed through a discharge. Exemplary of this is U.S. Pat. No. 2,275,958.

It is also known that a plurality of wire brushes may be employed which engage the filter plate and remove the sediment therefrom. Exemplary of this is U.S. Pat. No. 3,017,029.

While all of the above designs have useful applications, problems arise where fibrous or other debris which tends to mat is carried in the fluid to be strained. The fibrous debris tends to mat and entangle itself on the straining media, thereby making removal by the conventional means of reverse flushing very difficult and often virtually impossible.

One such patent which recognizes the problems of fibrous debris is U.S. Pat. No. 3,392,839. That patent teaches the use of a fine mesh strainer element in combination with other elements in the form of honeycomb grids, the action of which prevents excessive entanglement and build up of fibers in and on the fine mesh element. The honeycomb grids may conveniently be made up of an assembly of metal strips in which the ratio between the length and cross section of the apertures is such as to shield the intermediate fine mesh screen from excessive contact with the fibrous debris.

Regardless of the means employed to trap fibrous debris, the fibrous debris more often than not becomes entangled on the straining media, thereby making removal by conventional means difficult. In addition, where valuable or toxic fluids are being strained, it would cause waste or danger to employ that particular fluid for purposes of backwashing. Finally, in low pressure applications there is often insufficient pressure to provide for backwashing effectively, particularly where an entangled mat forms a part of the debris to be flushed.

SUMMARY OF THE INVENTION

Our design is specifically intended for straining media on which fibrous or other debris tends to form in mats making removal by conventional means virtually impossible. We further provide a backwash which does not cause loss of valuable fluids or danger in the case of toxic fluids.

We provide an automatic backwashing strainer having a fixed straining media and a rotating, backwashing device. The backwashing device of the rotary type provides high pressure liquid such as hot water for backwashing. We further employ a new design for the straining media in which the straining media has considerable depth in the direction of flow so as to prevent downstream entangling of fibrous solids. The new design further provides a series of compartments along the strainer element formed by protruding surfaces for engagement with the rotating backwash supply arms. These compartments collect the debris and where the debris extends into adjacent compartments, a shearing means causes shearing of the debris into sections for eventual removal.

DESCRIPTION OF THE PREFERRED EMBODIMENTS

Figure 1:
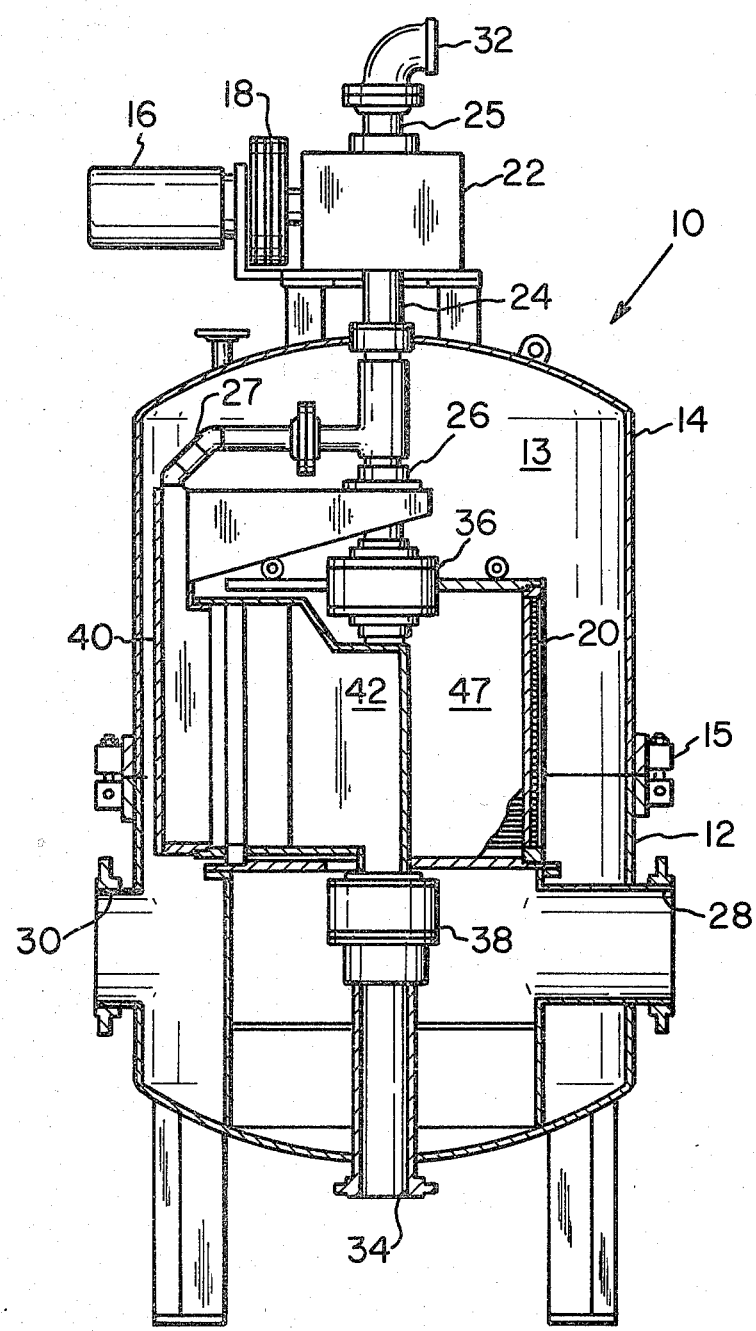
FIG. 1 is a section through the entire strainer.

The strainer, generally designed 10, comprises a strainer body 12 joined to a cover 14 through connections 15 to form strainer chamber 13, FIG. 1. The connection 15 includes standard latch bolts, cover nuts, hinge pins, washers and cotter pins, the details of which do not form a part of the subject invention. A hollow drive shaft 24 extends through the cover 14 and into the chamber 13. Drive shaft 24 is driven by motor 16 through a belt drive arrangement 18 and a gear reducer 22. Drive shaft 24 connects to an outer backwash arm 40 through an appropriate coupling 26. Shaft 24 also connects to an inner backwash arm 42 through an appropriate coupling and upper bearing 36. Inner backwash arm 42 terminates in lower bearing 38.

The cylindrical strainer element 20 is positioned within strainer chamber 13 and is rigidly secured therein so as to be non-rotatable, FIG. 1. The main fluid inlet 28 extends through the wall of body 12 at a location below the strainer element 20. Likewise, the main fluid outlet 30 exits through the wall of body 12 at a location below strainer element 20 and diametrically opposite inlet 28.

A rotating coupling having a backwash inlet 32 connected to a backwash fluid source (not shown) directs the backwash fluid through conduit 25, into hollow drive shaft 24 and then into conduit 27 which feeds into outer backwash arm 40, FIG. 1. After the backwash fluid has cleaned the strainer element 20, it passes along with the debris through backwash outlet 34 exiting through the bottom of the body 12.

The strainer element 20 comprises end rings 44, strainer plates 46, vertical bars 48, horizontal rings 54, connecting rods 50 and spacer washers 52, FIGS. 3-7.

Figure 3:
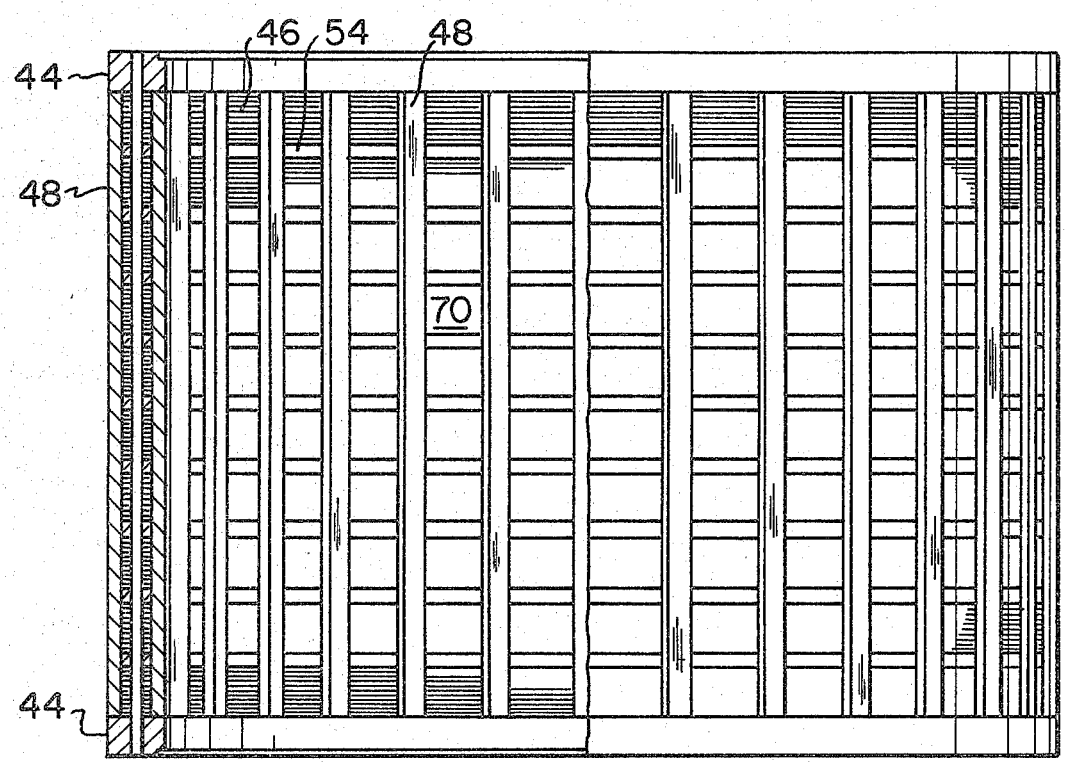
FIG. 3 is a section through the strainer element taken along lines III—III of FIG. 4.
Figure 4:
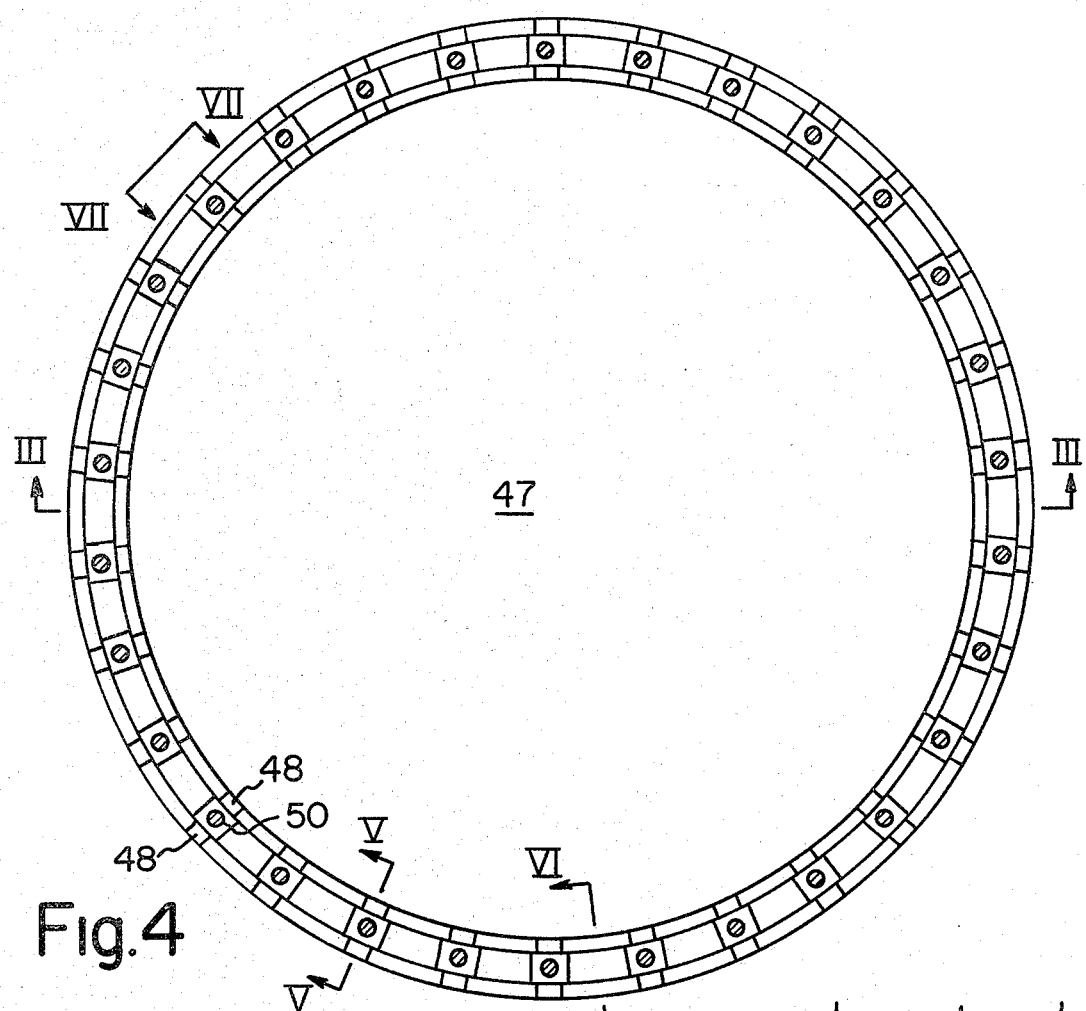
FIG. 4 is a plan view of the strainer element.
Figure 5:
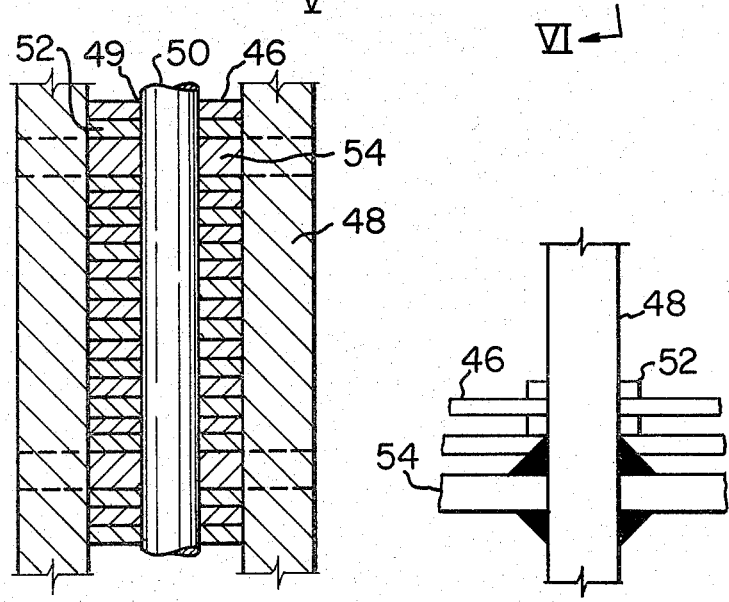
FIG. 5 is a broken away section taken along lines V—V of FIG. 4.
Figure 7:
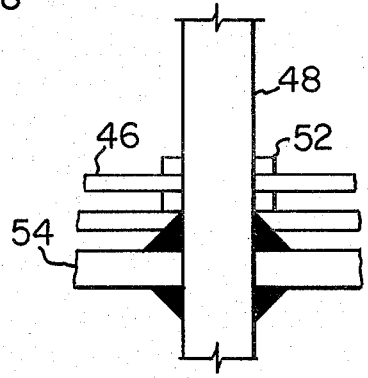
FIG. 7 is a broken away elevational view taken at lines VII—VII of FIG. 4.

Specifically, strainer plates 46 are ring-shaped to form, when assembled, a large central aperture 47, FIGS. 1 and 4. Central aperture 47 forms a chamber in fluid communication with main fluid inlet 28. The strainer plates 46 include a plurality of bores 49 which are equally spaced about each plate and midway of the inner and outer plate diameters. The strainer plates 46, when stacked, are maintained in spaced relationship from one another by means of a plurality of spacer washers 52 positioned about each plate 46, FIG. 5. The spacer washers 52 and the strainer plates 46 are positioned so that their respective bores are in alignment and rods 50 are inserted through the aligned bores to maintain the assembled relationship, FIGS. 4 and 5. The strainer element 20 terminates at each end in end rings 44, FIG. 3.

Figure 2:
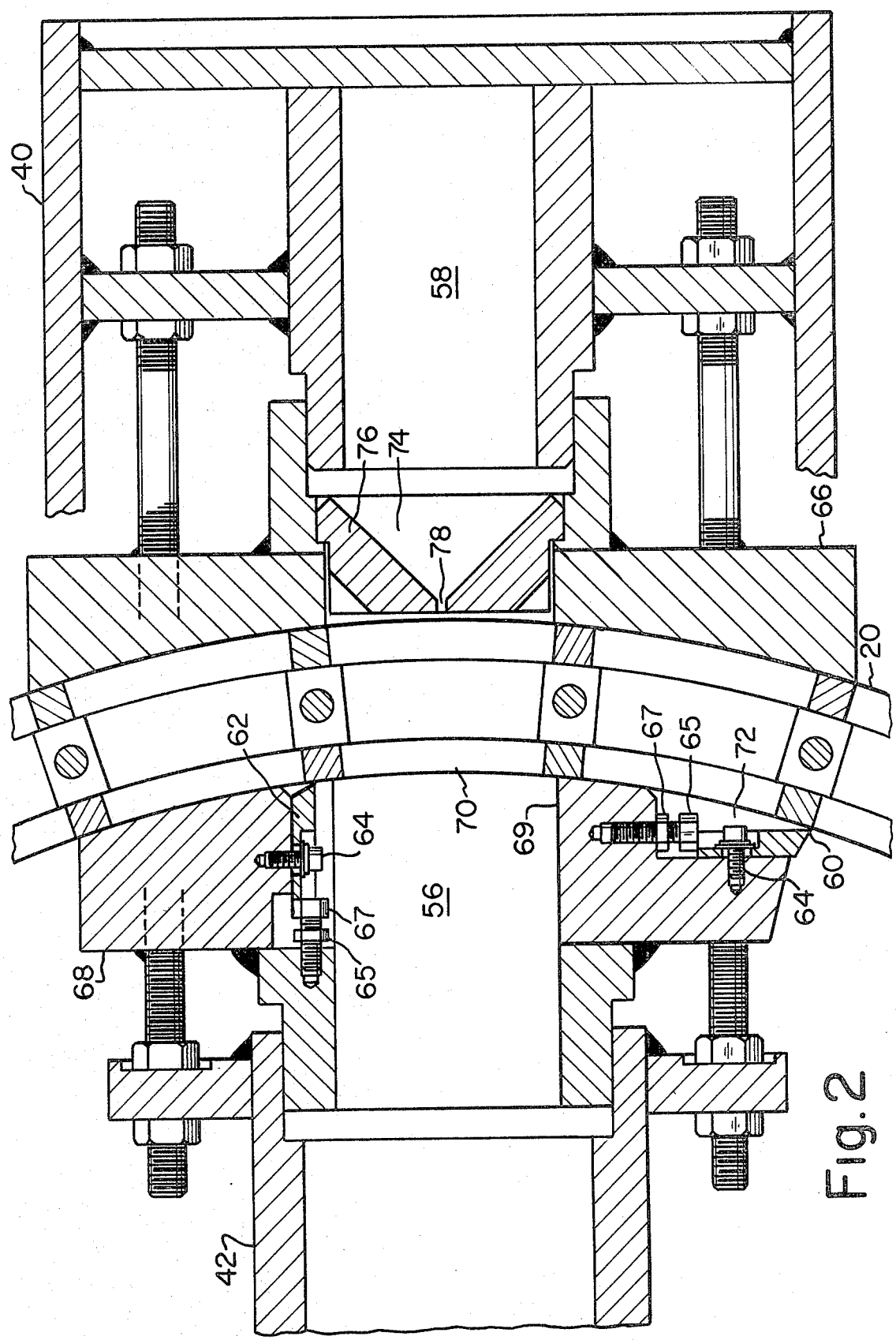
FIG. 2 is a broken away section through the backwash arms and the strainer element.
Figure 6:
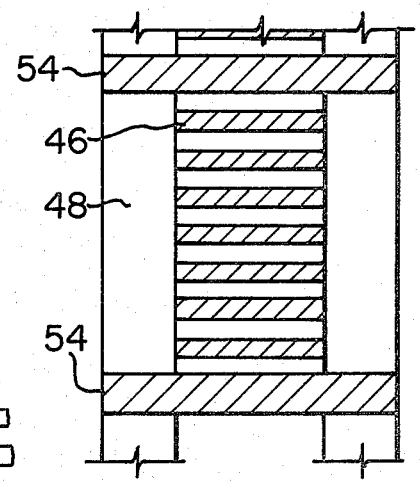
FIG. 6 is a broken away section taken along lines VI—VI of FIG. 4.

Spaced vertically along the inner and outer diameters of the strainer plates 46 are vertically extending bars 48, FIGS. 3 and 6. Positioned horizontally at spaced intervals in lieu of strainer plates 46 are annular rings 54 generally of greater thickness than the strainer plates 46, FIG. 6. Both the vertical rods 48 and the horizontal rings 54 protrude radially inward and radially outward of the strainer plates 46. The effect of these protruding vertical bars and horizontal rings is to form individual compartments 70 in coaxial alignment with the strainer passages, FIGS. 2 and 3. Weld seals are applied at the intersection of the vertical bars 48 and the horizontal rings 54 so as to seal each of the individual compartments 70, FIG. 7.

The washers 52 perform a function in addition to spacing the strainer plates 46. Specifically, washers 52 coact with the vertical bars 48 to form a vertical solid wall so fluid cannot pass from one row of vertical compartments to the adjacent rows, FIGS. 5 and 6. This isolates a single vertical row of compartments during backwashing.

The inner backwash arm 42 has connected at its radial terminus an inner backwash shoe member 68, which member is curved to the contour of the strainer element 20, FIG. 2. Inner shoe member 68 includes a central aperture 69 dimensioned to align with the compartments 70 of the strainer element 20. Specifically, aperture 69 is dimensioned to the spacing between adjacent bars 48 and has an axial extent to embrace all the compartments in vertical alignment. At the forward end of shoe member 68 is a shouldered recess 72. A cutting blade 60 is connected to member 68 within recess 72 by means of machine screw 64 and an appropriate lock washer (not shown). An adjustable machine screw 65 and jam nut 67 abuts the noncutting terminal end of blade 60 as to permit adjustment of the blade 60.

A second cutting blade 62 is mounted adjacent the aperture 69 and along the trailing portion of member 68 by means of machine screws 64 and adjusting screws 65 and jam nut 67, FIG. 2. As will be described in more detail hereinafter, the cutting blade 62 acts as a backup for the primary cutting blade 60. Blade 60 will typically be constructed of blade material such as a chrome molybdenum alloy steel.

Operating in synchronization with the inner backwash arm 42 through the rotation of common shaft 24 is outer backwash arm 40, FIG. 2. Outer backwash arm 40 terminates in shoe member 66 which conforms to the contour of the O.D. of the strainer element 20 and which includes a central aperture 74, also dimensioned to be in registry with the compartments 70. However, a pair of vertical bars 76 are secured to arm 40 within aperture 74. Thus, bars 76 extend the vertical length of aperture 74 and are inclined to one another so as to form a thin slot 78 out of which the backwash liquid exits. This creates an increase in velocity for a given flow and facilitates removal of the debris. The backwash arm 40 also includes a backwash inlet chamber 58 in fluid communication with conduit 27, FIG. 1.

A typical strainer element 20 will have bars 48 and rings 54 spaced to form compartments 70 which are about three inches wide and two inches tall on both sides of the strainer element 20. The bars 48 and rings 54 will extend radially inward and outward one-half inch beyond the strainer plates 46. Functionally, it is only necessary that these compartments be formed along the inner surface of the strainer where the debris collects in mat form. However, forming compartments along the outer surface facilitates fabrication and does permit a fitting engagement of the backwash shoe member and the strainer element.

In operation, the fluid to be strained such as tar sand containing crude oil, water, naptha, sand and fibrous material enters the strainer 10 through inlet 28 where it passes upward into aperture 47 of the strainer element 20. Thereafter it passes through the strainer element 20 and out through the outlet 30. The various debris is entrained on the inside of the strainer element 20 with the fibrous material generally not being long enough to extend beyond the depth of the strainer plates 46 and cause stapling which is the intertwining of fibers on the downstream side of the strainer element. However, the debris does collect on the upstream side of the strainer element and forms a matting of solids.

Operating continuously or on a timed basis is the automatic backwash arms 40 and 42. These arms are driven, for example, at six rpm by the single shaft 24 which connects through the gear reducer 22 and belt drive 18 to motor 16. At the same time the backwash fluid such as high temperature water at 170° F. and at a high pressure, for example, 50 to 75 psi is passed through backwash inlet 32 into conduit 27 and to the inlet chamber 58. The velocity of the fluid is increased as it passes through the restricted orifice, slot 78. It then passes through the strainer element into the backwash outlet chamber 56 and out through the backwash outlet 34.

The inner backwash arm 42 rotates in synchronization with the outer backwash arm 40. Therefore, the forward cutting blade 60 and the trailing cutting blade 64 slidingly engage the protruding surfaces of the bars 48 and rings 54 which form the compartments 70 so as to cut the matted debris into rectangular sections of a size consistent with the compartment 70. These mats are then forced off the strainer elements 46 by means of the high pressure backwash fluid passing through slot 70 of the outer arm 40 to the inner arm 42 and through the strainer element 20. The debris and backwash fluid exit the strainer 10 through the backwash outlet 34.

Where debris is of such a character that it does not mat between adjacent compartments, the blades are not necessary, and the compartments will collect the debris and permit removal by backwashing alone. It is only when there is very high solids loading or the debris contains long fibers that will mat between adjacent compartments that the knife blades are necessary.

Figure 8:
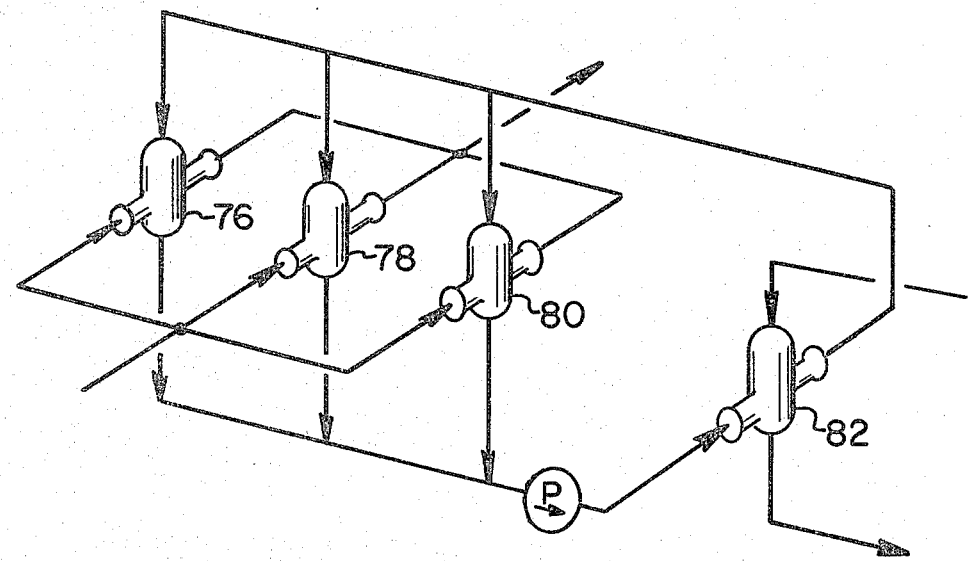
FIG. 8 is a schematic showing three strainers in parallel with the backwash being treated by a fourth strainer.

The backwash exiting the backwash outlet 34 may be rich in the fluid being treated, e.g. oil. In addition, an exchange takes place between the backwashing fluid and the main fluid so as to dilute the main fluid. To minimize these problems, a series of strainers may be connected in parallel with the backwash itself being treated by an additional strainer, FIG. 8. Strainers 76, 78 and 80 are hooked in parallel having a backwash feed line and backwash exit line. The backwash exit line is connected to a fourth strainer 82. A pump P is placed in the backwash exit line to replenish pressure losses developed in strainers 76, 78 and 80. The strained fluid exiting strainer 82 can then be used as the backwash fluid for strainer 76, 78 and 80 and a closed system is formed for the backwash fluid. In this manner one only has to provide backwash fluid to the one strainer 82 and there is but a single discharge to handle.

We claim:

1. In a strainer of the automatic backwashing type including a strainer element having an upstream and downstream side and a backwash arm for passing over the strainer element at least along the upstream side so as to provide a backwash to remove debris entrained on the strainer element, the improvement comprising:
   A. protruding surfaces extending radially beyond the strainer element to form aligned vertical compartments for mating engagement with the backwash arm;
   B. straining passageways associated with the strainer element being substantially greater in depth than height and in coaxial alignment with the compartments; and
   C. shearing means connected to the backwash arm for engaging the protruding surfaces in spaced relationship to the straining passageways for shearing any entrained debris extending between adjacent compartments.

2. The improvement of claim 1, said protruding surfaces formed by a plurality of spaced bars vertically positioned about the strainer element and extending substantially the length thereof.

3. The improvement of claim 1, said strainer element formed of a plurality of annular stacked strainer plates maintained in spaced relationship to form said straining passageways therebetween.

4. A strainer for removing debris capable of matting from a fluid comprising:
   A. a strainer body having a fluid inlet and fluid outlet;
   B. a strainer element positioned within the strainer to strain the fluid passing therethrough comprising a plurality of stacked annular strainer plates maintained in spaced relationship to form straining passages between adjacent plates, said passages being substantially greater in depth than height;
   C. protruding surfaces formed of a plurality of spaced bars vertically positioned about the strainer plates and extending substantially the length of said strainer element and extending radially inward from the strainer element on an upstream side thereof to form rows of vertically extending compartments to collect the debris;
   D. a rotating backwash arm for rotating along the upstream side of the strainer element to matingly isolate with each row of compartments to remove by backwashing the debris; and
   E. motor and shaft means to drive the backwash arm.

5. The strainer of claim 4, each strainer plate including a plurality of bores, said bores being aligned from plate to plate and rods extending through said bores to maintain an assembled relationship.

6. The strainer of claim 5, said strainer element including a plurality of washers positioned between the plates on the rods to maintain said spaced relationship and coact with the vertical bars to isolate each vertical row from its adjacent vertical rows.

7. The strainer of claim 4, certain of said strainer plates extending radially beyond the remaining strainer plates to form horizontal protruding surfaces which in conjunction with the vertical protruding surfaces form rectangular compartments.

8. The strainer of claim 4 including a cutting blade adapted for movement along and in engagement with the compartments for shearing matted debris.

9. The strainer of claim 4, said protruding surfaces extending both inward and outward from the strainer plates so as to form compartments along upstream and downstream sides of the straining element.

10. The strainer of claim 8 wherein said cutting blade is connected to a leading end of said backwash arm.

11. The strainer of claim 10 wherein said cutting blade is adjustable with respect to the strainer element so as to permit adjustment to maintain slidable engagement therewith.

12. The strainer of claim 10 including a second cutting blade connected to a trailing end of said backwash arm.

13. The strainer of claim 4 including a second backwash arm positioned adjacent a downstream side of the strainer element, said second backwash arm rotated in synchronization with the first backwash arm, said strainer including a backwash fluid different from the fluid being strained, delivered at elevated temperature and pressure to said second backwash arm, through said strainer and out of said first backwash arm.

14. The strainer of claim 13, said second backwash arm terminating in a chambered shoe member for sliding engagement with said strainer element, said chamber being in fluid communication with the backwash fluid and the first backwash arm.

15. The strainer of claim 14 including an orifice formed in said chamber to increase the velocity of the fluid as it impinges upon the strainer element.

16. The strainer of claim 13, the shaft means being hollow and being in fluid communication with said second backwash arm to deliver said backwash fluid thereto.

17. In a strainer of the automatic backwashing type including a strainer element having an upstream and downstream side and a backwash arm for passing over the strainer element at least along the upstream side so as to provide a backwash to remove debris entrained on the strainer element, the improvement comprising:
   A. said strainer element having straining passageways substantially greater in depth than height and formed of a plurality of annular stacked strainer plates maintained in spaced relationship; and
   B. means associated with the strainer element forming compartments to collect the debris along the upstream side prior to backwashing said means comprising protruding surfaces formed by a plurality of spaced bars vertically positioned about the strainer element and extending substantially the length thereof and extending radially beyond the strainer element, certain of said strainer plates also extending radially beyond the remainder of said strainer plates to form along with the spaced bars rectangular shaped compartments for mating engagement with the backwash arm.

* * * * *